(12) United States Patent
Chen et al.

(10) Patent No.: US 8,193,725 B2
(45) Date of Patent: Jun. 5, 2012

(54) VOLTAGE CONVERTER, BACKLIGHT MODULE CONTROL SYSTEM AND CONTROL METHOD THEREOF

(75) Inventors: Ke-Horng Chen, Taipei County (TW); Chun-Yu Hsieh, Taichung (TW); Chia-Lin Liu, Tai-Chung Hsien (TW); Chi-Neng Mo, Taoyuan County (TW); Hun-Wei Chen, Taoyuan County (TW); Ming-Tsung Ho, Taipei Hsien (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 376 days.

(21) Appl. No.: 12/424,549

(22) Filed: Apr. 16, 2009

(65) Prior Publication Data

US 2010/0264847 A1 Oct. 21, 2010

(51) Int. Cl.
*G05F 1/00* (2006.01)
(52) U.S. Cl. .............. 315/291; 315/185 S; 315/247; 315/307; 315/312
(58) Field of Classification Search .......... 315/291, 315/307, 224, 294, 209, 219, 276, 308, 225, 315/209 R, 312–316
See application file for complete search history.

(56) References Cited

U.S. PATENT DOCUMENTS

| | | | |
|---|---|---|---|
| 6,621,235 B2 * | 9/2003 | Chang | 315/216 |
| 7,102,339 B1 * | 9/2006 | Ferguson | 323/284 |
| 7,202,608 B2 | 4/2007 | Robinson et al. | |
| 7,233,115 B2 | 6/2007 | Lys | |
| 7,557,520 B2 * | 7/2009 | Chen et al. | 315/291 |
| 7,675,245 B2 * | 3/2010 | Szczeszynski et al. | 315/291 |
| 7,705,543 B2 * | 4/2010 | Ragonesi et al. | 315/209 R |
| 7,714,517 B2 * | 5/2010 | Shih et al. | 315/291 |
| 7,872,621 B2 * | 1/2011 | Lee | 345/82 |
| 2008/0144236 A1 * | 6/2008 | Chiang et al. | 361/18 |

* cited by examiner

*Primary Examiner* — Shawki S Ismail
*Assistant Examiner* — Christopher Lo
(74) *Attorney, Agent, or Firm* — Winston Hsu; Scott Margo

(57) ABSTRACT

A backlight module control system includes a plurality of backlight sub-modules, a control signals output unit, a voltage converter and a plurality of current control units. The control signals output circuit is for providing a voltage control signal, a current control signal and a plurality of PWM signals; the voltage converter is coupled to the control signals output circuit and the backlight sub-modules, and is for outputting an output voltage to the backlight sub-modules according to the voltage control signal; the current control units are coupled to the backlight sub-modules, respectively, and each current control unit is for determining a current of its corresponding backlight sub-module according to the current control signal, and each current control unit is further utilized for determining whether its corresponding backlight sub-module is enabled or not according to its corresponding PWM signal. In addition, only one backlight module is enabled at a same time.

16 Claims, 6 Drawing Sheets

| $D_{a0}$ | $V_{ref\_1}$ | $V_{out}$ |
|---|---|---|
| 0 | $V_{11}$ | $V_{01}$ |
| 1 | $V_{12}$ | $V_{02}$ |

| $D_{r0}$ | $D_{r1}$ | $V_{ref\_2}$ |
|---|---|---|
| 0 | 0 | $V_{21}$ |
| 0 | 1 | $V_{22}$ |
| 1 | 0 | $V_{23}$ |
| 1 | 1 | 0 |

FIG. 4

VOLTAGE CONVERTER, BACKLIGHT MODULE CONTROL SYSTEM AND CONTROL METHOD THEREOF

BACKGROUND OF THE INVENTION

1. Field of the Invention

The present invention relates to a voltage converter and a backlight module control system, and more particularly, to a DC/DC voltage converter and a backlight module control system utilizing the DC/DC converter and utilizing color sequential method to drive a liquid crystal display (LCD) panel.

2. Description of the Prior Art

Due to differences of processes and materials of light emitting diodes (LEDs) having different colors, threshold voltages of the LEDs are different. Therefore, when the LEDs having different colors are built in a backlight module, LEDs having different colors require different operating voltages, and a backlight module control system needs a plurality of voltage converters to provide a plurality of operating voltages for the LEDs having different colors. Please refer to FIG. 1. FIG. 1 is a diagram illustrating a prior art backlight module control system 100. As shown in FIG. 1, the backlight module control system 100 includes a power supply 110, a plurality of voltage converters 120_1-120_N, a plurality of backlight sub-modules 130_1-130_N and a plurality of resistors $R_1$-$R_N$, where each backlight sub-module 130_1-130_N includes a plurality of LEDs.

In the operation of the backlight module control system 100, the voltage converters 120_1-120_N are utilized for converting an input voltage provided by the power supply 110 to operating voltages for the backlight sub-modules 130_1-130_N, respectively, to drive the backlight sub-modules 130_1-130_N. However, because the backlight module control system 100 requires many voltage converters, manufacturing cost of the backlight module control system is increased.

SUMMARY OF THE INVENTION

It is therefore an objective of the present invention to provide a backlight module control system which requires only one voltage converter and a control method thereof, to solve the above-mentioned problems.

According to one embodiment of the present invention, a voltage converter includes a comparator, a sawtooth generator, a transconductance amplifier, a pulse width modulation (PWM) signal generator, an inductor, current limiting circuit and an output circuit. The comparator is utilized for comparing a reference voltage and a feedback voltage to generate a first current; the sawtooth generator is utilized for generating a sawtooth current according to the reference voltage; the transconductance amplifier is utilized for generating a second current according to an input voltage; the PWM signal generator is utilized for generating a PWM signal according to the first current, the second current and the sawtooth current; the current limiting circuit is utilized for limiting a current on the inductor; and the output circuit is utilized for generating an output voltage and the feedback voltage according to the current on the inductor.

According to another embodiment of the present invention, a backlight module control system includes a plurality of backlight sub-modules, a control signals output unit, a voltage converter and a plurality of current control units. The control signals output circuit is utilized for providing a voltage control signal, a current control signal and a plurality of PWM signals; the voltage converter is coupled to the control signals output circuit and the plurality of backlight sub-modules, and is utilized for outputting an output voltage to the backlight sub-modules according to the voltage control signal; the plurality of current control units are coupled to the plurality of backlight sub-modules, respectively, and each current control unit is utilized for determining a current of its corresponding backlight sub-module according to the current control signal, and each current control unit is further utilized for determining whether its corresponding backlight sub-module is enabled or not according to its corresponding PWM signal. In addition, only one backlight module is enabled at the same time.

According to another embodiment of the present invention, a control method of a backlight module control system includes: providing a voltage control signal, a current control signal and a plurality of PWM signals; outputting an output voltage to a plurality of backlight sub-modules according to the voltage control signal; determining currents of the plurality of backlight sub-modules according to the current control signal, respectively; and determining whether the plurality of backlight sub-modules are enabled or not according to the PWM signals, respectively. In addition, only one backlight module is enabled at the same time.

The backlight module control system and the control method of the present invention can utilize only one voltage converter to provide operating voltages of a plurality of backlight sub-modules by using control signals outputted by a control signals output unit, and utilize the operating voltages to sequentially drive the backlight sub-modules. Because the backlight module control system of the present invention includes only one voltage converter, when compared with the prior art backlight module control system having many voltage converters, the present invention decreases the manufacturing cost. In addition, because the plurality of backlight sub-modules are sequentially driven, the voltage converter of the present invention can provide fast voltage conversion, and output the correct voltage level.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram showing voltage levels of input/output signals of the first digital-to-analog converter, the second digital-to-analog converter and the voltage converter.

DETAILED DESCRIPTION

Figure 1:
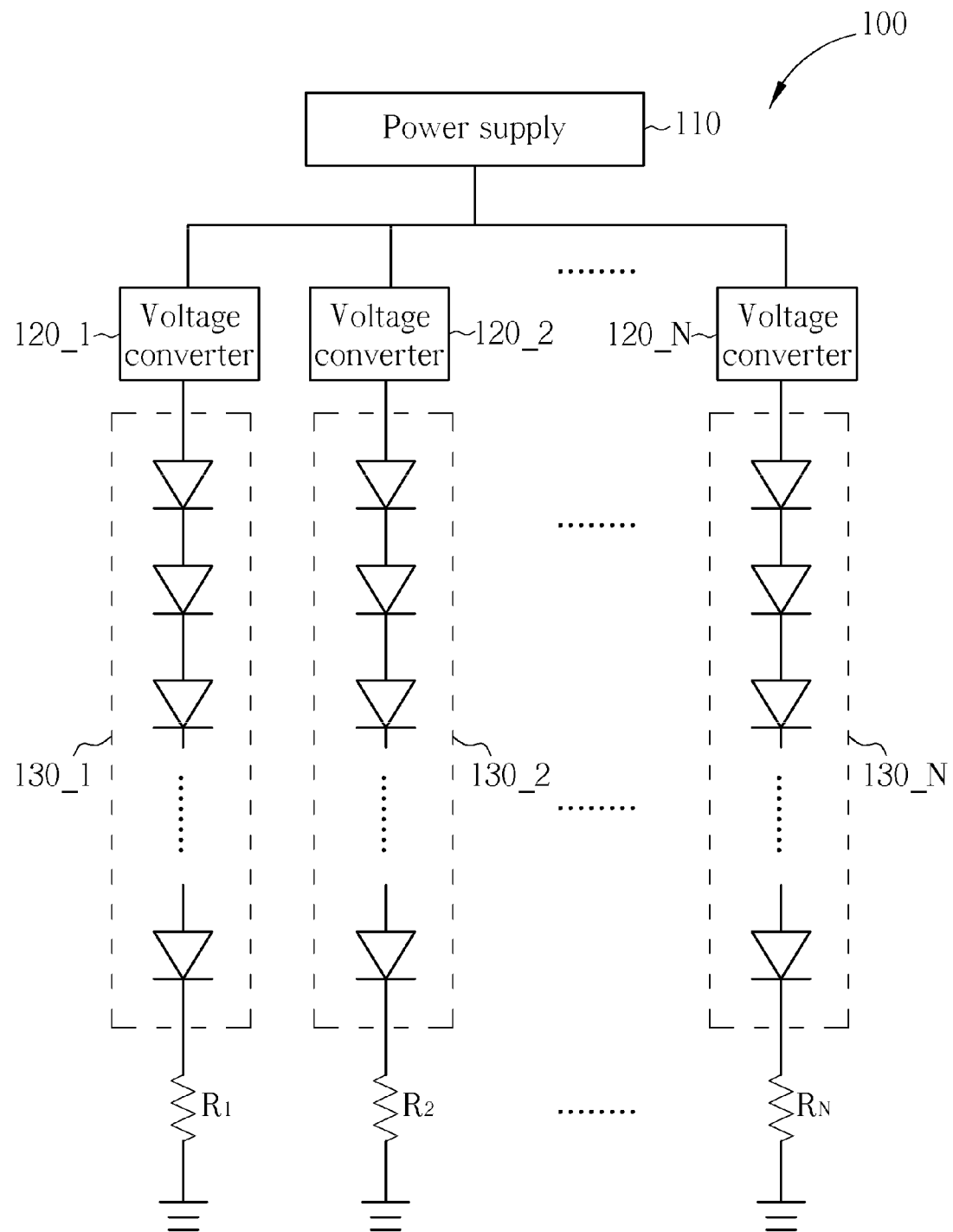
FIG. 1 is a diagram illustrating a prior art backlight module control system.
Figure 2:
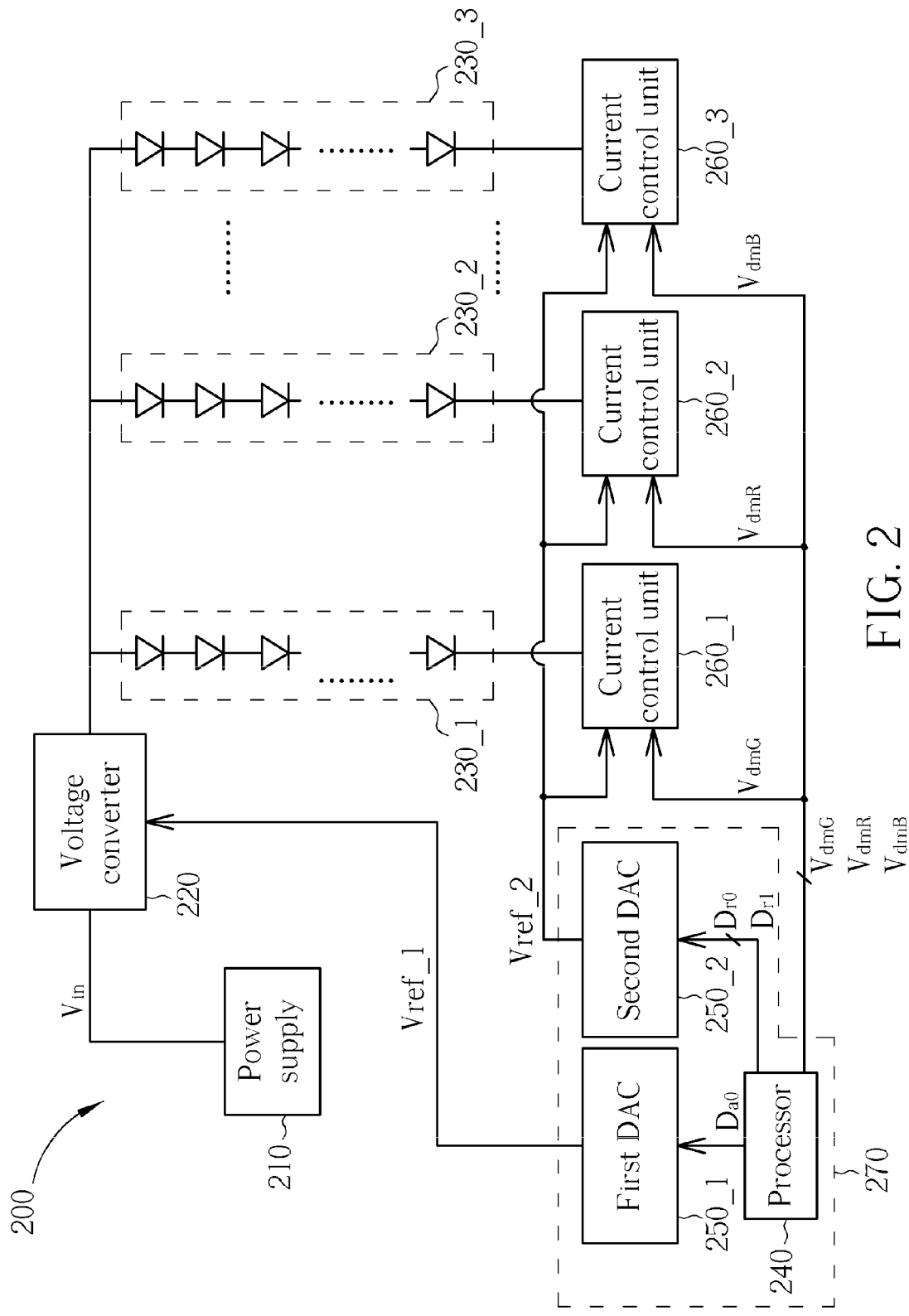
FIG. 2 is a diagram illustrating a backlight module control system according to one embodiment of the present invention.

Please refer to FIG. 2. FIG. 2 is a diagram illustrating a backlight module control system 200 according to one embodiment of the present invention. As shown in FIG. 2, the backlight module control system 200 includes a power supply 210, a voltage converter 220, a control signals output unit 270, a plurality of backlight sub-modules (in this embodiment, three backlight sub-modules 230_1 -230_3 are shown) and a plurality of current control units (in this embodiment, three current control units 260_1 -260_3 are shown). The control signals output unit 270 includes a processor 240, a first digital-to-analog converter 250_1 and a second digital-to-analog converter 250_2. The backlight sub-module 230_1 includes a plurality of green LEDs and is a green backlight sub-module, the backlight sub-module 230_2 includes a plurality of red LEDs and is a red backlight sub-module, and the backlight sub-module 230_3 includes a plurality of blue LEDs and is a blue backlight sub-module. In addition, the backlight module control system utilizes a color sequential method to drive a LCD panel, that is, only one backlight sub-module 230_1-230_3 is enabled at the same time.

Figure 3:
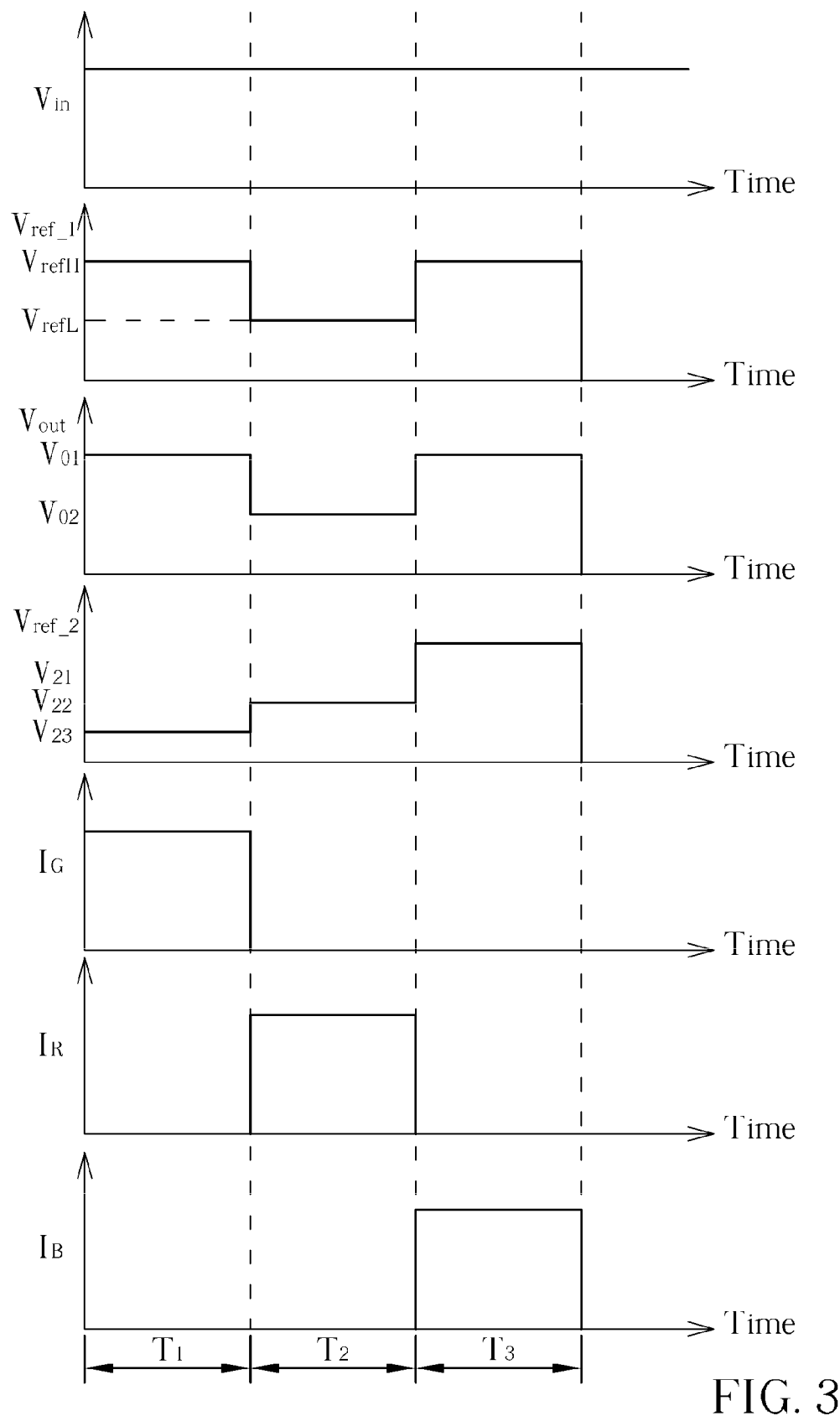
FIG. 3 is a timing diagram of control signals of the backlight module control system shown in FIG. 2.

Please refer to FIG. 2-FIG. 4 together. FIG. 3 is a timing diagram of control signals of the backlight module control system 200 shown in FIG. 2. FIG. 4 is a diagram showing voltage levels of input/output signals of the first digital-to-analog converter 250_1, the second digital-to-analog converter 250_2 and the voltage converter 220. In the operations of the backlight module control system 200, first, during a period $T_1$, the first digital-to-analog converter 250_1 receives a first digital signal $D_{a0}$ to generate a voltage control signal $V_{ref\_1}$. Then, the voltage converter 220 generates an output voltage $V_{out}$ according to the voltage control signal $V_{ref\_1}$ and an input voltage $V_{in}$ provided by the power supply. During this period, the first digital signal $D_{a0}$ is at a low voltage level (i.e., digital signal "0"), a voltage level of the voltage control signal is $V_{refH}$, and a voltage level of the output voltage $V_{out}$ is $V_{01}$, where $V_{01}$ is an operating voltage required by the green backlight sub-module 230_1. In addition, the second digital-to-analog converter 250_2 receives two second digital signals $D_{r0}$ and $D_{r1}$ outputted by the processor 240 to generate a current control signal $V_{ref\_2}$. Then, the current control unit 260_1 makes the green backlight sub-module 230_1 have a current $I_G$ according the current control signal $V_{ref\_hd\ 2}$. During this period, the second digital signals $D_{r0}$ and $D_{r1}$ are at low voltage levels (i.e., digital signal "0") and a voltage level of the current control signal $V_{ref\_2}$ is $V_{21}$. In addition, the current control units 260_1 -260_3 receive three PWM signals $V_{dmG}$, $V_{dmR}$ and $V_{dmB}$, respectively, and determine whether the backlight sub-modules are enabled or not, respectively. During time $T_1$, because only the green backlight sub-module 230_1 needs to be enabled, therefore, the PWM signals $V_{dmR}$ and $V_{dmB}$ are at low voltage levels (i.e., the backlight sub-modules 230_2 and 230_3 are disabled). In addition, the PWM signal $V_{dmG}$ not only enables the green backlight sub-module 230_1 but also controls a luminance of the green backlight sub-module 230_1.

During a period $T_2$, the first digital signal $D_{a0}$ is at a high voltage level (i.e., digital signal "1"), the voltage level of the voltage control signal $V_{ref\_1}$ is therefore $V_{refL}$, and the voltage level of the output voltage $V_{out}$ is $V_{02}$, where $V_{02}$ is an operating voltage required by the red backlight sub-module 230_2. In addition, the second digital signals $D_{r0}$ and $D_{r1}$ are respectively at low and high voltage levels (i.e., the digital signals "0" and "1"), and the voltage level of the current control signal $V_{ref\_2}$ is $V_{22}$. Therefore, the current control unit 260_2 makes the red backlight sub-module 230_2 have a current $I_R$ according the current control signal $V_{ref\_2}$. In addition, during the period $T_2$, because only the red backlight sub-module 230_2 needs to be enabled, the PWM signals $V_{dmG}$ and $V_{dmB}$ are at low voltage levels (i.e., the backlight sub-modules 230_1 and 230_3 are disabled). In addition, the PWM signal $V_{dmR}$ not only enables the red backlight sub-module 230_2 but also controls a luminance of the red backlight sub-module 230_2.

Similarly, during a period $T_3$, the first digital signal $D_{a0}$ is at the low voltage level (i.e., digital signal "0"), the voltage level of the voltage control signal $V_{ref\_1}$ is therefore $V_{refH}$, and the voltage level of the output voltage $V_{out}$ is $V_{01}$, where $V_{01}$ is an operating voltage required by the blue backlight sub-module 230_3. In addition, the second digital signals $D_{r0}$ and $D_{r1}$ are respectively at high and low voltage levels (i.e., the digital signals "1" and "0"), and the voltage level of the current control signal $V_{ref\_2}$ is $V_{23}$. Therefore, the current control unit 260_3 makes the blue backlight sub-module 230_3 have a current $I_B$ according the current control signal $V_{ref\_2}$. In addition, during the period $T_3$, because only the blue backlight sub-module 230_3 needs to be enabled, the PWM signals $V_{dmG}$ and $V_{dmR}$ are at low voltage levels (i.e., the backlight sub-modules 230_1 and 230_2 are disabled).

In addition, the periods $T_1$-$T_3$ form a frame time, that is, the green backlight sub-module 230_1, the red backlight sub-module 230_2, and the blue backlight sub-module 230_3 are sequentially enabled during a frame time.

In addition, the conversion relationships between the first digital signal $D_{a0}$, the voltage control signal $V_{ref\_1}$ and the output voltage $V_{out}$ are for illustrative purposes only. In practice, as long as the output voltage $V_{out}$ fits in with the operating voltage required by the backlight sub-module, the first digital signal $D_{a0}$ and the voltage control signal $V_{ref\_1}$ can be designed according to the designer's consideration. Similarly, as long as the currents of the backlight sub-modules 230_1 -230_3 are $I_G$, $I_R$ and $I_B$, respectively, the second digital signals $D_{r0}$ and $D_{r1}$ and the current control signal $V_{ref\_2}$ can also be designed according to the designer's consideration.

It is noted that, in this embodiment, because the operating voltages of the green and blue backlight sub-modules 230_1 and 230_3 are the same, the processor 240 outputs only one first digital signal $D_{a0}$. However, if the green and blue backlight sub-modules 230_1 and 230_3 require different operating voltages, the processor 240 can output two or more first digital signals to make the voltage control signal $V_{ref\_1}$ and the output voltage $V_{out}$ have at least three voltage levels, respectively, to drive the backlight sub-modules 230_1 -230_3. These alternative designs all fall in the scope of the present invention.

In addition, in the present invention, the voltage control signal $V_{ref\_1}$ and the current control signal $V_{ref\_2}$ are respectively generated by the first digital signal $D_{a0}$ and the second digital signals $D_{r0}$ and $D_{r1}$ outputted by the processor 240. However, the processor 240 can also directly output the voltage control signal $V_{ref\_1}$ and the current control signal $V_{ref\_2}$. In addition, the first digital-to-analog converter 250_1 can also be integrated into the voltage converter 220. These alternative designs all fall in the scope of the present invention.

In addition, because the backlight module control system of the present invention is applied to the LCD panel driven by the color sequential method, the voltage converter 220 needs a fast voltage conversion rate. However, because the prior art DC/DC converter is limited by a lower bandwidth of the system, when the voltage control signal $V_{ref\_1}$ changes, the prior art DC/DC converter cannot immediately output the correct voltage level. Therefore, the present invention discloses a voltage converter which can rapidly switch to a required output voltage.

Figure 5:
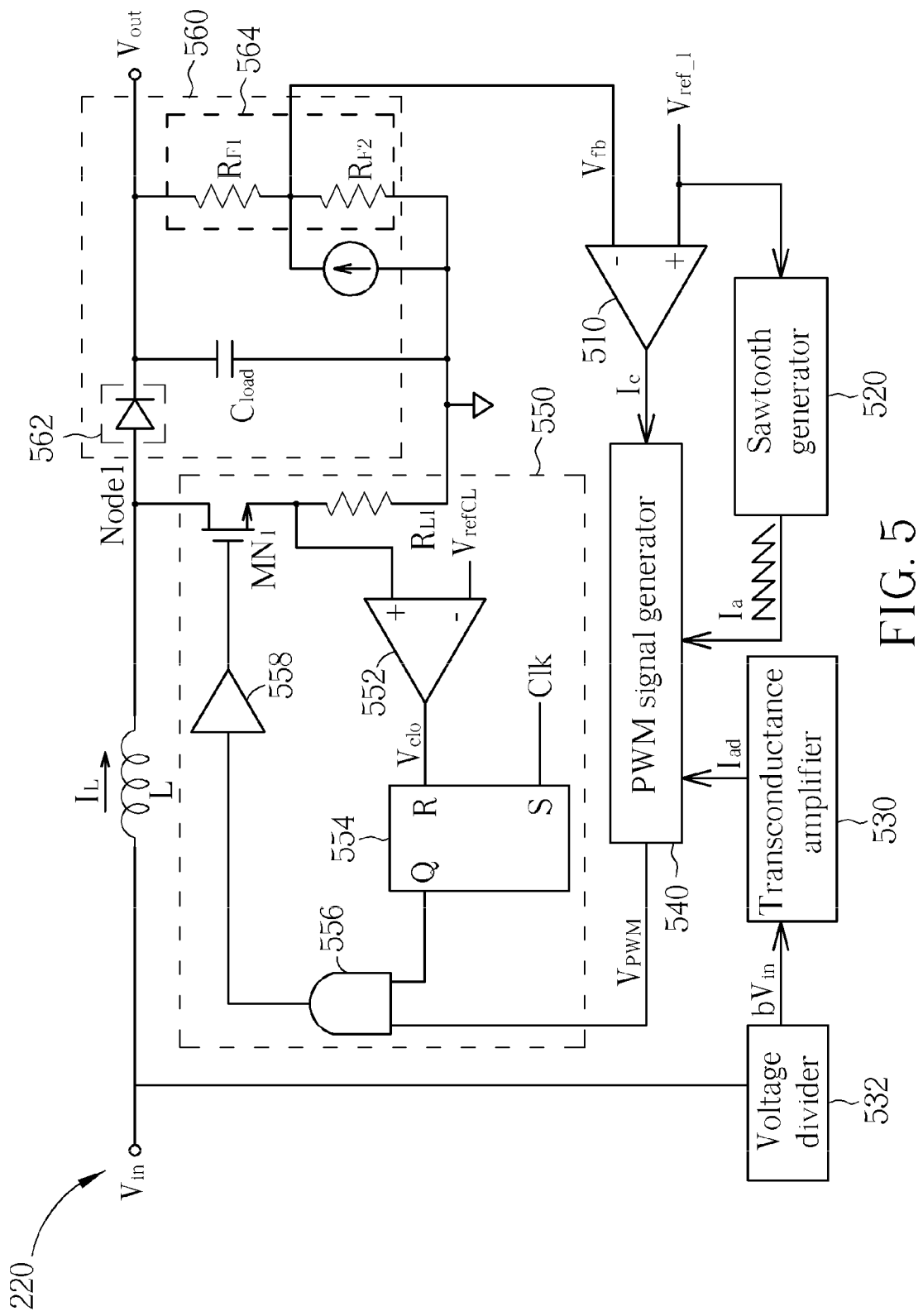
FIG. 5 is a diagram illustrating the voltage converter shown in FIG. 2 according to one embodiment of the present invention.

Please refer to FIG. 5. FIG. 5 is a diagram illustrating the voltage converter 220 shown in FIG. 2 according to one embodiment of the present invention. As shown in FIG. 5, the voltage converter 220 includes a comparator 510, a sawtooth generator 520, a transconductance amplifier 530, a voltage divider 532, a PWM signal generator 540, an inductor L, a current limiting circuit 550 and an output circuit 560. The current limiting circuit 550 includes a comparator 552, a flip-flop 554, an AND gate 556, a driving circuit 558, a transistor $MN_1$ and a resistor $R_{L1}$. The output circuit 560 includes a Schottky diode 562, a capacitor $C_{load}$ and a voltage divider 564, where the voltage divider 564 includes two resistors $R_{F1}$ and $R_{F2}$.

Figure 6:
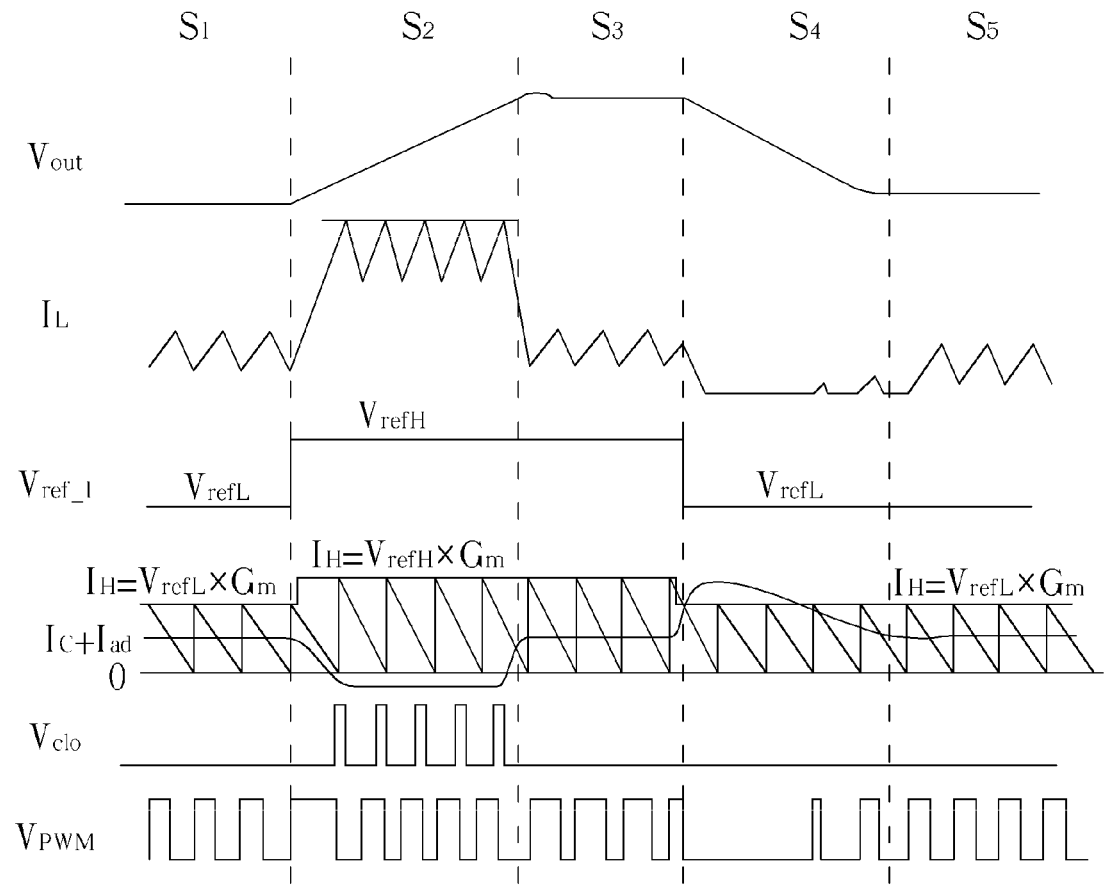
FIG. 6 is a timing diagram illustrating signals of the voltage converter shown in FIG. 5.

Please refer to FIG. 5 and FIG. 6 together. FIG. 6 is a timing diagram illustrating signals of the voltage converter 220 shown in FIG. 5. At a first stage $S_1$, the voltage level of the output voltage $V_{out}$ of the system is $V_{02}$ shown in FIG. 3 and the system is stable, and a duty cycle of the PWM signal $V_{PWM}$ is also stable. At this time, the voltage level of the voltage control signal $V_{ref\_1}$ is $V_{refL}$ and a voltage level of the feedback voltage $V_{fb}$ is also equal to (or similar to) $V_{refL}$. At a second stage $S_2$, the voltage level of the voltage control signal $V_{ref\_1}$ immediately becomes a higher voltage $V_{refH}$. At this time, the comparator 510 compares the voltage control signal $V_{ref\_1}$ and the feedback voltage $V_{fb}$ to generate a first current $I_c$, and the sawtooth generator 520 generates a sawtooth current having a greater amplitude (the upper boundary $I_H$ is equal to a product of conductance $G_m$ of the comparator 510 and the voltage control signal $V_{ref\_1}$). In addition, the transconductance amplifier 530 generates a second current $I_{ad}$ according to a voltage $b*V_{in}$ generated from the voltage divider 532 (In this embodiment, $b=R_{F1}/(R_{F1}+R_{F2})$). After that, the PWM signal generator 540 generates the PWM signal $V_{PWM}$ according to the first current $I_c$, the sawtooth current $I_a$ and the second current $I_{ad}$. In light of the above description, when the voltage control signal $V_{ref\_1}$ is switched to be at a higher voltage level, a summation of the first and second current $(I_c+I_{ad})$ instantly decreases, and the sawtooth current $I_a$ increases instantly. By comparing $(I_c+I_{ad})$ with $I_a$, the PWM signal $V_{PWM}$ is rapidly converted and keeps on a maximum voltage level. Furthermore, because the PWM signal $V_{PWM}$ is at the maximum voltage level, the transistor $MN_1$ is fully turned on.

When the transistor $MN_1$ is fully turned on, a voltage level of a node Node1 will decrease to be close to a ground voltage, therefore, there will be a great voltage difference between the two sides of the inductor L and the current $I_L$ on the inductor L rapidly increases. In order to prevent damage of the circuit due to the over-high current $I_L$, when the current $I_L$ is closer to a predetermined value (i.e., maximum current value), the current limiting circuit 550 will turn off the transistor $MN_1$. When the transistor $MN_1$ is turned off, an energy of the current $I_L$ is transmitted to the external capacitor $C_{load}$ through the Schottky diode 562, and, at this time a voltage level of a positive node of the comparator 552 of the current limiting circuit 550 becomes zero (ground). In this embodiment, a negative node of the comparator 552 is connected to a reference voltage $V_{refCL}$, and the reference voltage $V_{refCL}$ is set to be 0.2V, therefore, a compared voltage $V_{clo}$ outputted by the comparator 552 is inputted into the flip-flop 554, and sequentially performed by the AND gate 556 and the driving circuit 558 to control the transistor $MN_1$ be turned on or turned off. In a next period, the transistor $MN_1$ is turned on and the system becomes a current limiting loop, that is, the voltage converter 220 is controlled by the current limiting circuit 550. At this time, the current $I_L$ keeps on a maximum current value (i.e., the predetermined value), and the output voltage $V_{out}$ can rapidly approach the required voltage level.

At a third stage $S_3$, when the output voltage $V_{out}$ approaches a voltage level required by the backlight sub-module (in this embodiment, $V_{01}$ shown in FIG. 3), the feedback voltage $V_{fb}$ generated from the voltage divider 564 will approach the voltage control signal $V_{ref\_1}$ (at voltage level $V_{refH}$). At this time, the first current $I_c$ rapidly decreases to ground voltage, and the PWM signal $V_{PWM}$ can rapidly switch to a correct duty cycle.

At a fourth stage $S_4$, the voltage control signal $V_{ref\_1}$ becomes a lower voltage level $V_{refL}$ instantly, and at this time, the summation of the first and second current $(I_c+I_{ad})$ instantly increases, and the sawtooth current $I_a$ decreases instantly. By comparing $(I_c+I_{ad})$ with $I_a$, the PWM signal $V_{PWM}$ is rapidly converted and keeps on a minimum voltage level. Furthermore, because the PWM signal $V_{PWM}$ is at the minimum voltage level, the transistor $MN_1$ is turned off, and the output voltage $V_{out}$ therefore decreases.

At a fifth stage $S_5$, when the output voltage $V_{out}$ approaches a voltage level required by the backlight sub-module (in this embodiment, $V_{02}$ shown in FIG. 3), the feedback voltage $V_{fb}$ generated from the voltage divider 564 will approach the voltage control signal $V_{ref\_1}$ (at voltage level $V_{refL}$). At this time, the first current $I_c$ rapidly decreases to ground voltage, and the PWM signal $V_{PWM}$ can rapidly switch to a correct duty cycle.

Briefly summarizing the present invention, the backlight module control system of the present invention is applied to the LCD panel driven by the color sequential method. Compared with the prior art backlight module control system, the backlight module control system of the present invention only includes one voltage converter, and the voltage converter has a higher voltage conversion rate. Therefore, the manufacturing cost can be decreased without lowering the display quality.

Those skilled in the art will readily observe that numerous modifications and alterations of the device and method may be made while retaining the teachings of the invention.

What is claimed is:
1. A voltage converter, comprising:
a comparator, for comparing a reference voltage and a feedback voltage to generate a first current;
a sawtooth generator, for generating a sawtooth current according to the reference voltage;
a transconductance amplifier, for generating a second current according to an input voltage;
a pulse width modulation (PWM) signal generator, coupled to the comparator, the sawtooth generator and the transconductance amplifier, for generating a PWM signal according to the first current, the sawtooth current and the second current;
an inductor, coupled to a voltage input node;
a current limiting circuit, coupled to the PWM signal generator and the inductor, for limiting a current on the inductor; and
an output circuit, coupled to the inductor, the comparator and a voltage output node, for generating an output voltage and the feedback voltage according to the current on the inductor.

2. The voltage converter of claim 1, further comprising:
a voltage divider, coupled to the voltage input node and the transconductance amplifier, for generating a divided input voltage according to the input voltage, wherein the transconductance amplifier generates the second current according to the divided input voltage.

3. The voltage converter of claim 1, further comprising:
a Schottky diode;
a capacitor, coupled to the Schottky diode and the voltage output node; and a voltage divider, coupled to the voltage output node, for generating the feedback voltage according to the output voltage.

4. A backlight module control system, comprising:
a plurality of backlight sub-modules, wherein each backlight sub-module comprises at least one backlight;
a control signals output unit, for providing a voltage control signal, a current control signal and a plurality of first PWM signals;
a voltage converter, coupled to the control signals output unit and the plurality of backlight sub-modules, for outputting an output voltage to the plurality of backlight sub-modules according to the voltage control signal; and
a plurality of current control units, respectively coupled to the plurality of backlight sub-modules, wherein each current control unit is coupled to the control signals output unit, and is utilized for determining a current of its corresponding backlight sub-module according to the current control signal, and is utilized for directly receiving its corresponding PWM signal and utilizing the corresponding PWM signal to control its corresponding backlight sub-module to be turned on or turned off, where two voltage levels of the PWM signal correspond to turned on backlight sub-module and turned off backlight sub-module, respectively;
wherein the current control units utilizes the PWM signals to control the backlight sub-modules to be sequentially enabled during a frame time, and only one backlight sub-module is enabled at a same time.

5. The backlight module control system of claim 4, wherein the plurality of backlight sub-modules includes a red backlight sub-module, a green backlight sub-module, and a blue backlight sub-module, the red backlight sub-module comprises at least one red light emitted diode (LED), the green backlight sub-module comprises at least one green LED, and the blue backlight sub-module comprises at least one blue LED.

6. The backlight module control system of claim 5, wherein the red backlight sub-module, the green backlight sub-module and blue backlight sub-module are sequentially enabled during a frame time.

7. The backlight module control system of claim 4, further comprising:
a power supply, coupled to the voltage converter, for providing an input voltage to the voltage converter.

8. The backlight module control system of claim 4, wherein the control signals output unit comprises:
a processor, for providing at least one first digital signal and at least one second digital signal;
a first digital-to-analog converter, coupled to the processor and the voltage converter, for outputting the voltage control signal according to the first digital signal; and
a second digital-to-analog converter, coupled to the processor and the plurality of current control units, for outputting the current control signal according to the second digital signal.

9. The backlight module control system of claim 4, wherein the voltage converter comprises:
a comparator, for comparing the voltage control signal and a feedback voltage to generate a first current;
a sawtooth generator, for generating a sawtooth current according to the voltage control signal;
a transconductance amplifier, for generating a second current according to an input voltage;
a PWM signal generator, coupled to the comparator, the sawtooth generator and the transconductance amplifier, for generating a PWM signal according to the first current, the sawtooth current and the second current;
an inductor, coupled to a voltage input node;
a current limiting circuit, coupled to the PWM signal generator and the inductor, for limiting a current on the inductor; and
an output circuit, coupled to the inductor, the comparator and a voltage output node, for generating an output voltage and the feedback voltage according to the current on the inductor.

10. The backlight module control system of claim 9, further comprising:
a voltage divider, coupled to the voltage input node and the transconductance amplifier, for generating a divided input voltage according to the input voltage, wherein the transconductance amplifier generates the second current according to the divided input voltage.

11. The backlight module control system of claim 9, further comprising:
a Schottky diode;
a capacitor, coupled to the Schottky diode and the voltage output node; and
a voltage divider, coupled to the voltage output node, for generating the feedback voltage according to the output voltage.

12. A control method of a backlight module control system, comprising:
providing a voltage control signal, a current control signal and a plurality of PWM signals;
outputting an output voltage to a plurality of backlight sub-modules according to the voltage control signal;
determining a current corresponding to one backlight sub-module according to the current control signal; and
directly receiving the PWM signals and utilizing the PWM signals to control the backlight sub-modules to be turned on or turned off, respectively, where two voltage levels of the PWM signal correspond to turned on backlight sub-module and turned off backlight sub-module, respectively;
wherein the backlight sub-modules are sequentially enabled during a frame time,
and only one backlight sub-module is enabled at the same time.

13. The control method of claim 12, further comprising:
arranging a red backlight sub-module, a green backlight sub-module, and a blue backlight sub-module, wherein the red backlight sub-module comprises at least one red light emitted diode (LED), the green backlight sub-module comprises at least one green LED, and the blue backlight sub-module comprises at least one blue LED.

14. The control method of claim 13, further comprising:
sequentially enabling the red backlight sub-module, the green backlight sub-module and blue backlight sub-module during a frame time.

15. The control method of claim 12, further comprising:
providing an input voltage.

16. The control method of claim 12, further comprising:
providing a processor to generate at least one first digital signal and at least one second digital signal;
providing a first digital-to-analog converter to output the voltage control signal according to the first digital signal; and
providing a second digital-to-analog converter to output the current control signal according to the second digital signal.

* * * * *